(12) United States Patent
Woolf et al.

(10) Patent No.: US 8,798,842 B2
(45) Date of Patent: Aug. 5, 2014

(54) TRAILER HITCH ALIGNMENT SYSTEMS AND METHODS

(75) Inventors: William David Woolf, Durham, NC (US); Gregory S. Hopper, Raleigh, NC (US)

(73) Assignee: Teleswivel, LLC, Durham, NC (US)

(*) Notice: Subject to any disclaimer, the term of this patent is extended or adjusted under 35 U.S.C. 154(b) by 245 days.

(21) Appl. No.: 13/354,928

(22) Filed: Jan. 20, 2012

(65) Prior Publication Data

US 2012/0191285 A1 Jul. 26, 2012

Related U.S. Application Data

(60) Provisional application No. 61/435,889, filed on Jan. 25, 2011.

(51) Int. Cl.
*G01C 22/00* (2006.01)
*G05D 1/00* (2006.01)

(52) U.S. Cl.
USPC ....... 701/25; 280/490.1; 280/489; 280/479.1; 280/479.3

(58) Field of Classification Search
USPC ................. 340/431; 701/25; 280/463, 477, 5, 280/490.1, 479.1, 479.3, 489
See application file for complete search history.

(56) References Cited

U.S. PATENT DOCUMENTS

| 5,729,194 | A | 3/1998 | Spears et al. |
| 5,951,035 | A | 9/1999 | Phillips, Jr. et al. |
| 6,068,281 | A * | 5/2000 | Szczypski .................. 280/479.2 |
| 6,259,357 | B1 * | 7/2001 | Heider .......................... 340/431 |
| 6,480,104 | B1 | 11/2002 | Wall et al. |
| 6,886,847 | B2 * | 5/2005 | Piper et al. ...................... 280/477 |
| 6,974,146 | B2 * | 12/2005 | Abair ............................... 280/470 |
| 7,142,098 | B2 * | 11/2006 | Lang et al. ...................... 340/431 |
| 7,207,588 | B2 | 4/2007 | Bergum et al. |
| 7,309,075 | B2 | 12/2007 | Ramsey et al. |
| 7,425,014 | B1 * | 9/2008 | Palmer ........................ 280/479.3 |
| 7,556,279 | B2 * | 7/2009 | Suhling .......................... 280/512 |
| 7,777,615 | B2 | 8/2010 | Okuda et al. |

(Continued)

FOREIGN PATENT DOCUMENTS

| CA | 2100375 | C | * | 7/1996 |
| CA | 2412458 | A1 | * | 5/2003 |

(Continued)

OTHER PUBLICATIONS

Effects of Sensor Placement and Errors on Path Following Control of a Mobile Robot-Trailer System; Hodo, D.W.; Hung, J.Y.; Bevly, D.M.; Millhouse, S.; American Control Conference, 2007. ACC '07; Digital Object Identifier: 10.1109/ACC.2007.4282739 Publication Year: 2007 , pp. 2165-2170.*

(Continued)

*Primary Examiner* — Cuong H Nguyen
(74) *Attorney, Agent, or Firm* — Myers Bigel Sibley & Sajovec

(57) ABSTRACT

Systems and methods for aligning a towing vehicle trailer hitch with the tongue of a trailer/towed vehicle are provided that enable a driver to know when the towing vehicle trailer hitch is close enough to the trailer tongue such that the two can be coupled. A trailer hitch includes a tow bar having a free end configured to be coupled to a trailer tongue. An alignment system includes at least one energy emitter secured to the vehicle that emits energy in the direction of the trailer tongue, and at least two sensors secured to the vehicle in spaced-apart relationship. The energy emitter(s) and sensors may be secured to the trailer or trailer hitch.

37 Claims, 10 Drawing Sheets

(56) References Cited

U.S. PATENT DOCUMENTS

| | | | |
|---|---|---|---|
| 7,793,967 B2 * | 9/2010 | McConnell | 280/491.1 |
| 7,850,193 B2 * | 12/2010 | Williams, Jr. | 280/507 |
| 7,909,350 B1 * | 3/2011 | Landry | 280/479.2 |
| 8,100,428 B2 * | 1/2012 | McConnell | 280/491.1 |
| 8,302,987 B2 * | 11/2012 | Williams et al. | 280/479.3 |
| 8,573,628 B2 * | 11/2013 | McConnell | 280/491.1 |
| 2005/0046147 A1 | 3/2005 | Piper et al. | |
| 2007/0080516 A1 * | 4/2007 | Simmons | 280/491.3 |
| 2011/0266763 A1 * | 11/2011 | Moore | 280/63 |
| 2013/0341887 A1 * | 12/2013 | Wolfe | 280/490.1 |

FOREIGN PATENT DOCUMENTS

| | | | | |
|---|---|---|---|---|
| GB | 002086325 A | * | 5/1982 | |
| GB | 2196917 A | * | 9/1986 | |
| GB | 002196917 A | * | 5/1988 | |
| GB | 2360021 A | * | 9/2001 | |

OTHER PUBLICATIONS

Contact state estimation using machine learning; Jamali, N.; Kormushev, P.; Caldwell, D.G.; Oceans—San Diego, 2013 Publication Year: 2013 , pp. 1-4.*

Notification of Transmittal of the International Search Report and the Written Opinion of the International Searching Authority, or the Declaration; International Search Report; Written Opinion of the International Searching Authority; Date of Mailing: Aug. 9, 2012; 14 pages.

* cited by examiner

TRAILER HITCH ALIGNMENT SYSTEMS AND METHODS

RELATED APPLICATION

This application claims the benefit of and priority to U.S. Provisional Patent Application No. 61/435,889 filed Jan. 25, 2011, the disclosure of which is incorporated herein by reference as if set forth in its entirety.

FIELD OF THE INVENTION

The present invention relates generally to towing and, more particularly, to trailer hitches utilized in towing.

BACKGROUND

Trailer hitches for coupling a towing vehicle to a trailer or towed vehicle are well known. Standard trailer hitches attached to towing vehicles commonly include a ball mounted on a tow bar for connection with a socket on the tongue of a trailer. Coupling of the ball and socket requires the driver of the vehicle to rearwardly maneuver the vehicle until the ball of the trailer hitch is vertically aligned with the socket of the trailer tongue. Without assistance, the driver typically has difficulty maneuvering the ball into position for engagement with the socket since the ball and socket are outside the driver's field of vision. Even with assistance, alignment of the trailer hitch components may be a frustrating and time consuming task.

Various types of telescoping and pivoting trailer hitches, referred to as articulating trailer hitches, have been proposed to allow coupling between misaligned vehicles. Even these types of trailer hitches can be difficult to align with a stationary trailer because the trailer hitch on the towing vehicle and the trailer tongue coupler typically are out of sight of the driver of the towing vehicle.

The most conventional remedy to the alignment problem is to have a second person instructing a driver how to maneuver the towing vehicle. However, another person may not always be available to assist a driver of a towing vehicle. In addition, there is no standard "language" that easily communicates directional information to the driver of a towing vehicle.

A variety of alignment devices have been proposed, including devices mounted on both a trailer and on a trailer hitch that elevate an indicator of position of the trailer hitch and trailer tongue into the driver's field of view. Unfortunately, these devices can be inaccurate, prone to falling off, and typically must be removed prior to towing.

Camera systems have been deployed to display to the driver the area behind a towing vehicle. Unfortunately, cameras may be obscured by inclement weather, mud, and other obstructions. In addition, the displays provided by conventional camera systems may not provide a view that is intuitive as a guide to a driver as to which way to steer the towing vehicle to effect alignment. Moreover, these camera systems can be expensive.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

In view of the above, systems and methods for aligning a towing vehicle trailer hitch with the tongue of a trailer are provided that enable a driver to know when the towing vehicle trailer hitch is close enough to the trailer tongue such that the two can be coupled. A trailer hitch includes a tow bar having a free end configured to be coupled to a trailer tongue. An alignment system, according to some embodiments of the present invention, includes at least one energy emitter secured to the vehicle that emits energy in the direction of the trailer tongue, and at least two sensors secured to the vehicle in spaced-apart relationship. The energy emitter(s) and sensors may be secured to the trailer hitch in some embodiments of the present invention.

Each sensor is configured to generate signals in response to detecting a reflection of the emitted energy from the trailer tongue. The energy emitter may be, for example, an optical emitter, an infrared emitter, an acoustic emitter, or an ultrasound emitter, and the sensors may be optical sensors, infrared sensors, acoustic sensors, or ultrasound sensors, respectively. In some embodiments of the present invention, a separate energy emitter is not utilized. Instead, a pair of transducers (e.g., optical or acoustic transducers) are utilized, each of which emits energy in the direction of the trailer tongue and generates signals in response to detecting a reflection of the energy from the trailer tongue. In some embodiments of the present invention, three or more transducers may be utilized.

A processor is in communication with the sensors and processes the signals generated by the sensors to provide directional data representative of a location of the trailer tongue relative to a target zone that represents a location of the tow bar free end and, more specifically, a coupling apparatus located at the tow bar free end. The processor displays a representation of a location of the trailer tongue relative to the target zone within a user interface. The processor also may display directional information for the towing vehicle driver within the user interface for moving the vehicle such that the trailer tongue can become positioned within the target zone. The user interface may play audio directional information for moving the vehicle such that the trailer tongue can become positioned within the target zone, according to some embodiments of the present invention.

In some embodiments of the present invention, the user interface is located within the towing vehicle. For example, the user interface may be displayed as a "heads-up" display on a windshield of the vehicle or via a navigation system display associated with the vehicle. In some embodiments of the present invention, the user interface may be displayed via the display of a handheld device, such as a laptop computer, tablet computer, mobile phone, personal digital assistant, game system, and the like. In some embodiments of the present invention, the processor is a hand held device processor.

In some embodiments of the present invention, the towing vehicle includes an automated parking/steering system that receives the directional data from the processor. The automated parking/steering system utilizes the directional data to automatically move the vehicle relative to the trailer tongue to position the trailer tongue within the target zone.

In some embodiments of the present invention, the trailer hitch is an articulating trailer hitch with a movable tow bar that is extendable and pivotable relative to the vehicle. The target zone represents an area within which the free end of the tow bar can be positioned.

According to some embodiments of the present invention, a method of aligning a trailer hitch mounted to a vehicle with a trailer tongue includes emitting energy in the direction of the trailer tongue, generating signals in response to detecting a reflection of the energy from the trailer tongue at first and second sensors (e.g., optical sensors, infrared sensors, acoustic sensors, ultrasound sensors, etc.) secured to the vehicle in spaced-apart relationship, and processing the signals generated by the first and second sensors to provide directional data representative of a location of the trailer tongue relative to a target zone that represents a location of the tow bar free end. A representation of a location of the trailer tongue relative to the target zone is also displayed within a user interface located within the vehicle (e.g., a heads-up display on the windshield, displayed via navigation system display, etc.), or via the display of a handheld or other portable device. Directional information may also be displayed within the user interface for moving the vehicle such that the trailer tongue can become positioned within the target zone. Audio directional information may also be provided in some embodiments of the present invention.

In some embodiments of the present invention, the trailer hitch includes a movable tow bar that is extendable and pivotable relative to the vehicle. The target zone represents an area within which the free end of the tow bar having a coupler can be positioned.

According to some embodiments of the present invention, an alignment system may include energy emitters and sensors mounted to a towed vehicle/trailer. For example, an energy emitter may be secured to a trailer that emits energy in the direction of a towing vehicle, and at least two sensors may be secured to the trailer in spaced-apart relationship. Each sensor is configured to generate signals in response to detecting a reflection of the energy from the vehicle. A processor is in communication with the sensors and is configured to process the signals generated by the sensors to provide directional data representative of a location of a coupler/trailer tongue of the towed vehicle relative to a target zone that represents a location of a tow bar free end extending from the towing vehicle. As another example, a pair of transducers may be secured to a trailer/towed vehicle in adjacent, spaced-apart relationship, wherein each transducer emits energy in the direction of a towing vehicle and generates signals in response to detecting a reflection of the energy from the towing vehicle. A processor is in communication with the transducers that processes the signals generated by the transducers to provide directional data representative of a location of a coupler/trailer tongue of the towed vehicle relative to a target zone that represents a location of a tow bar free end extending from the towing vehicle.

Trailer hitch alignment systems, according to embodiments of the present invention, are durable, can be used in all types of weather, and have very high accuracy, thereby increasing the speed and safety with which a trailer or towed vehicle can be connected to a trailer hitch. Moreover, trailer hitch alignment systems, according to embodiments of the present invention can be attached to a trailer hitch without requiring modification to a vehicle to which the trailer hitch is attached.

Trailer hitch alignment systems, according to embodiments of the present invention, can be utilized with any type of trailer hitch including, but not limited to fixed trailer hitches and trailer hitches with movable tow bars. Moreover, trailer hitch alignment systems, according to embodiments of the present invention, can be utilized with fifth-wheel hitch systems, gooseneck hitch systems and other hitch systems utilized, for example, in agriculture, mining, rail, forestry, etc.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION

Figure 1A:
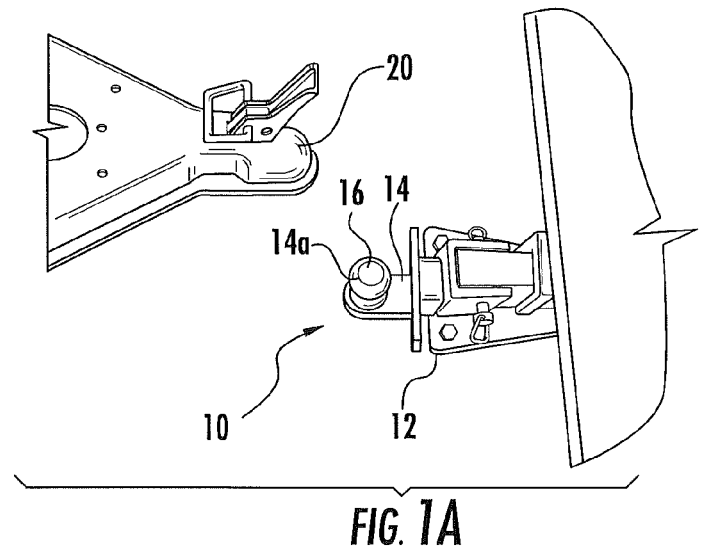
FIGS. 1A-1C are top perspective views of an exemplary articulating trailer hitch apparatus that may be utilized with embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. Furthermore, "connected" or "coupled" as used herein may include wirelessly connected or coupled. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "vehicle" includes all types of vehicles including, but not limited to, automobiles, trucks, military vehicles, airplanes, trains, etc., and also includes towed vehicles and towing vehicles.

The terms "trailer" and "towed vehicle", as used herein, are interchangeable and refer to any type of vehicle to be towed by a towing vehicle.

The term "target zone", as used herein, is a representation of a location of a tow bar free end and, more specifically, a location of a coupling apparatus secured to a tow bar free end. For movable tow bars associated with articulating trailer hitches, the target zone is a representation of an area within which the free end of the tow bar (and coupling apparatus secured thereto) can be positioned. For non-movable tow bars of fixed trailer hitches, the target zone is a representation of the location of the tow bar free end (and coupling apparatus secured thereto).

The term "real-time" is used to describe a process of sensing, processing, and displaying information in a time frame of milliseconds or microseconds. For example, user interfaces and processors according to some embodiments of the present invention are capable of updating and displaying the representation of a location of a trailer tongue and/or coupling apparatus relative to a target zone at the same rate or substantially the same rate as data is received from the various sensors, transducers, etc., as described herein.

Alignment systems, according to embodiments of the present invention, can be utilized with any type of hitches including Class I, II, III, IV and V hitches. Embodiments of the present invention can be utilized with hitches that are fixed and hitches having movable components, such as articulating tow bars. Moreover, embodiments of the present invention can be utilized with fifth-wheel hitches and gooseneck hitches. As would be understood by those skilled in the art of the present invention, a fifth-wheel hitch is conventionally mounted in the bed of a pickup truck so as to be located generally over the rear axle of the truck, and has a shape similar to that of a horseshoe. A trailer connects to the fifth wheel hitch via a downward-facing pin, called a king pin, along with a plate that rests on top of the fifth wheel hitch plate. The king pin locks into position so it is secure within the hitch but can pivot to accommodate turns. A gooseneck hitch utilizes a hitch ball that also is conventionally mounted in the bed of a pickup truck so as to be located generally over the rear axle of the truck. A trailer connects to the hitch ball via a downwardly extending goose neck with a coupler configured to engage the hitch ball.

Figure 1B:
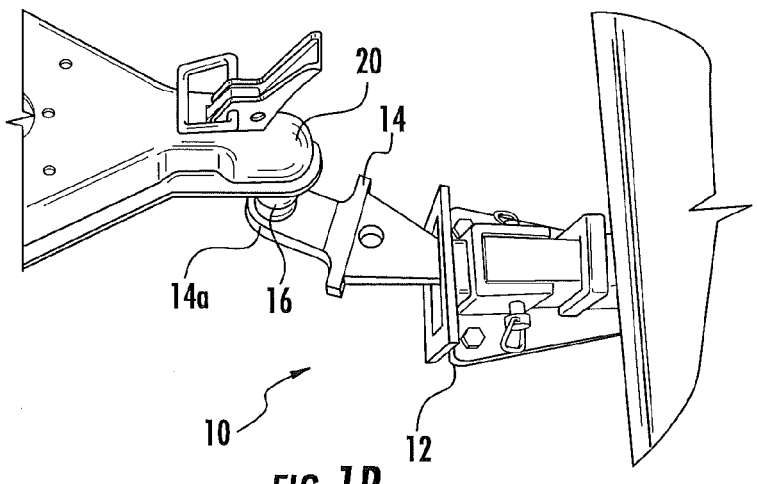
Figure 1C:
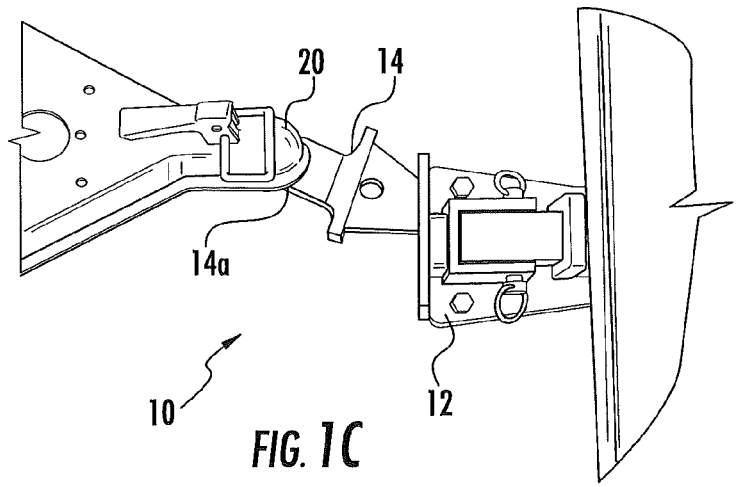

Referring now to FIGS. 1A-1C, an exemplary articulating trailer hitch apparatus 10 that may be utilized with embodiments of the present invention is illustrated. The illustrated trailer hitch 10 includes a housing 12 and a tow bar 14 movably disposed within the housing 12. The tow bar free end 14*a* has a tow ball 16 secured thereto. However, as would be understood by one skilled in the art of trailer hitches, various other types of coupling apparatus may be secured to the tow bar free end 14*a*, such as a pintle hook, a cushioned pintle hook, a swivel pintle hook, a lunette ring, a clevis pin attachment, etc., depending on the type of trailer tongue being secured to the tow bar 14. In FIG. 1A, the tow bar free end 14a and trailer tongue 20 are misaligned. In FIG. 1B, the tow bar 14 is articulated towards the trailer tongue 20 to overcome the misalignment. In FIG. 1C, the tow ball 16 and the coupling apparatus on the trailer tongue are properly aligned such that the trailer tongue 20 can be secured to the tow bar 14.

Figure 2A:
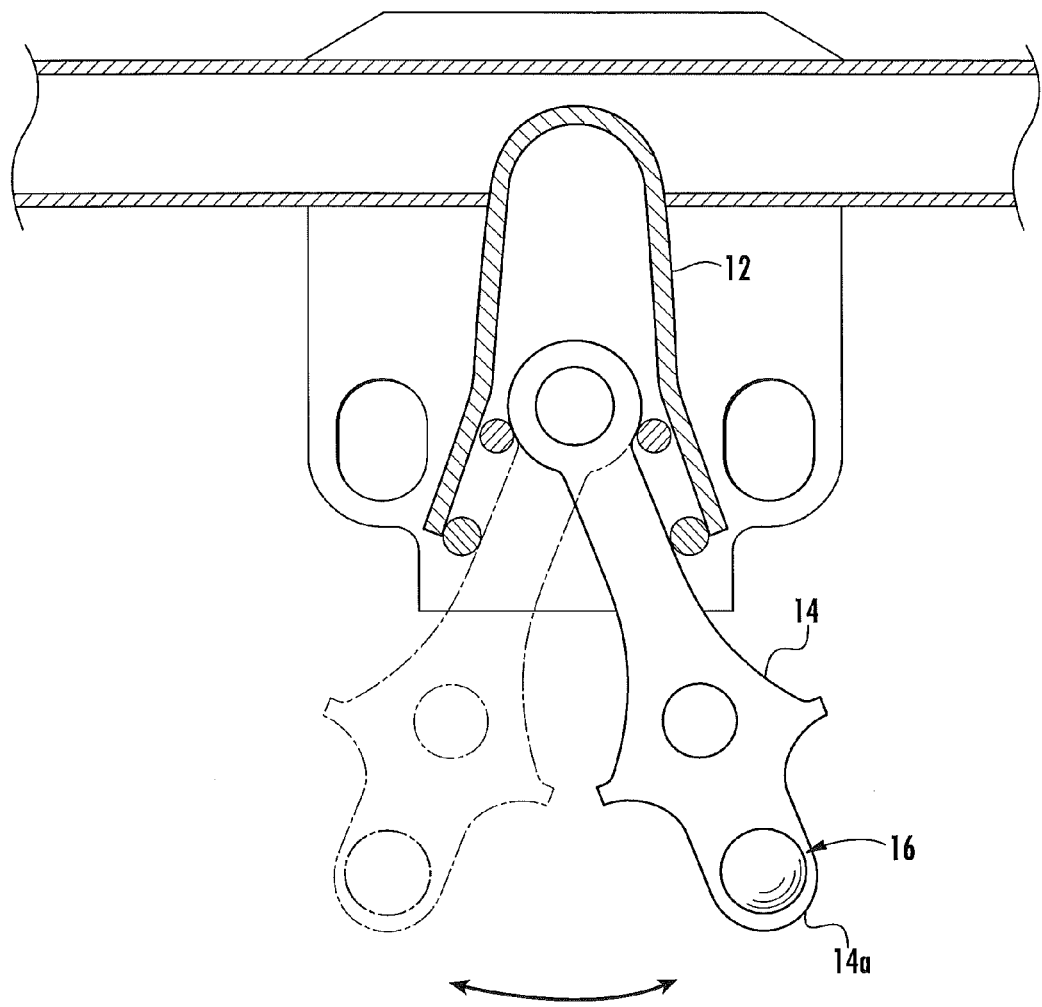
FIGS. 2A-2C are partial cut-away plan views of the trailer hitch of FIGS. 1A-1C illustrating the articulating movement of the tow bar free end relative to the trailer hitch housing.
Figure 2B:
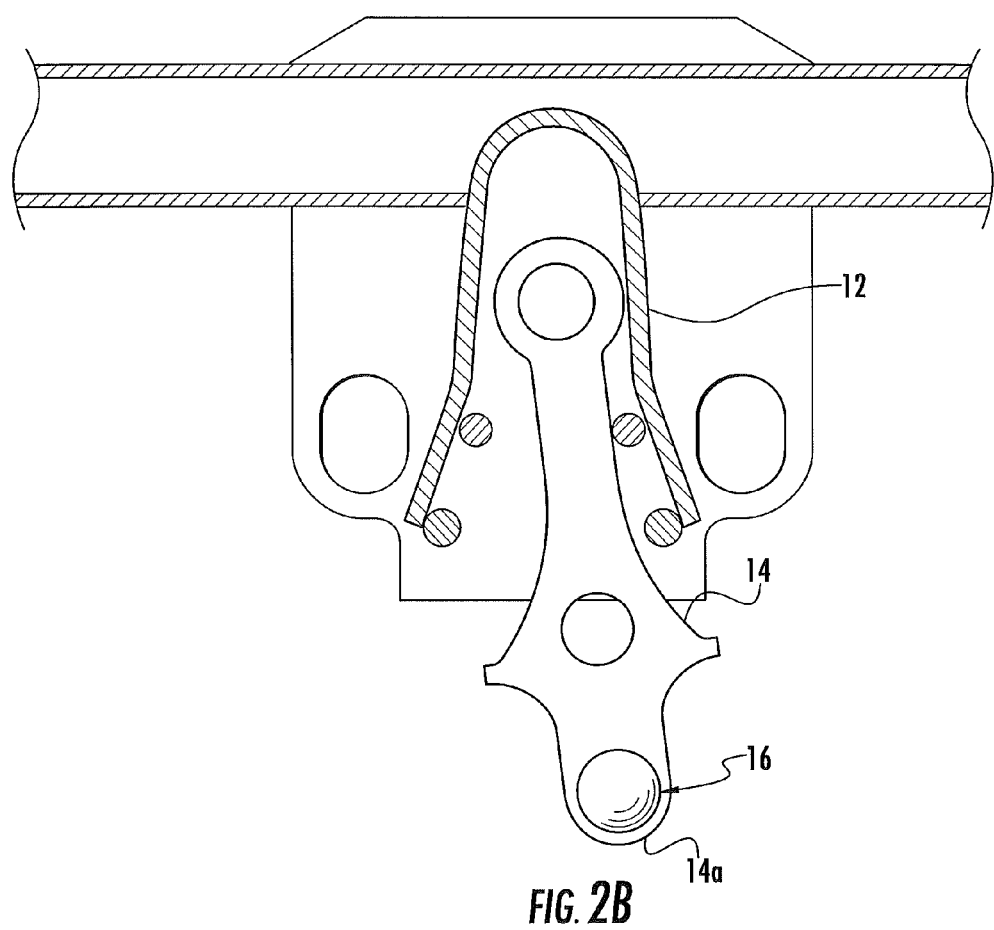
Figure 2C:
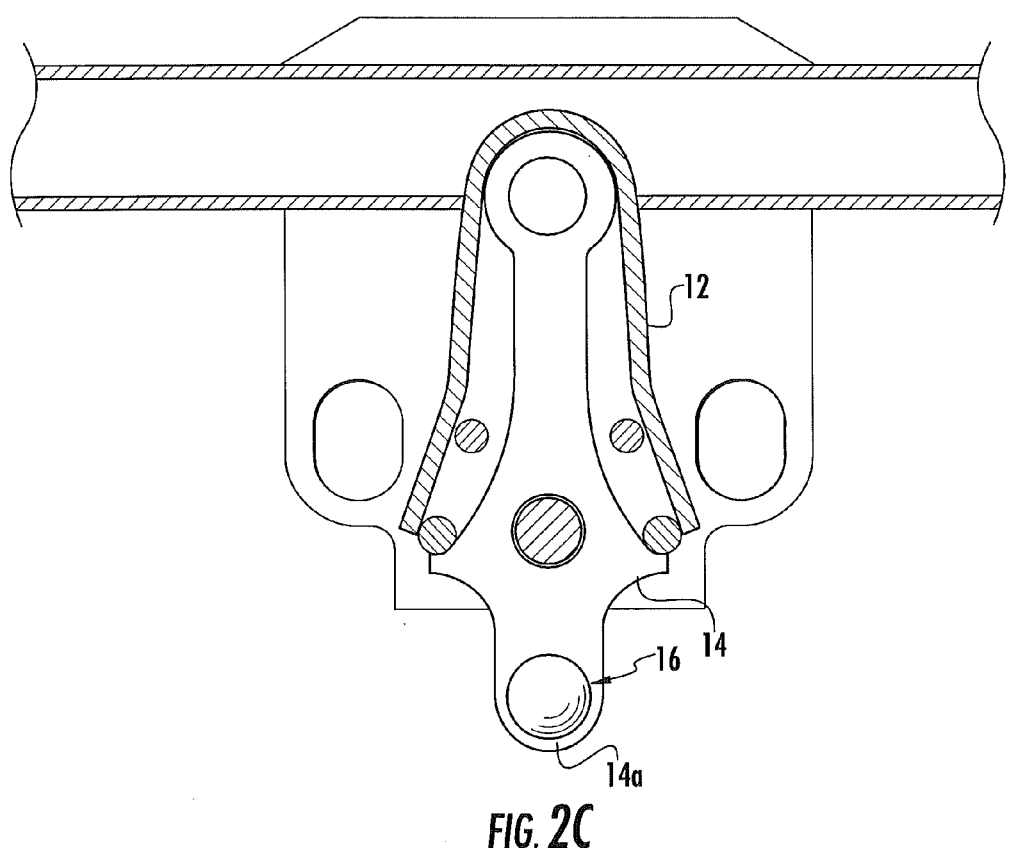
Figure 3:
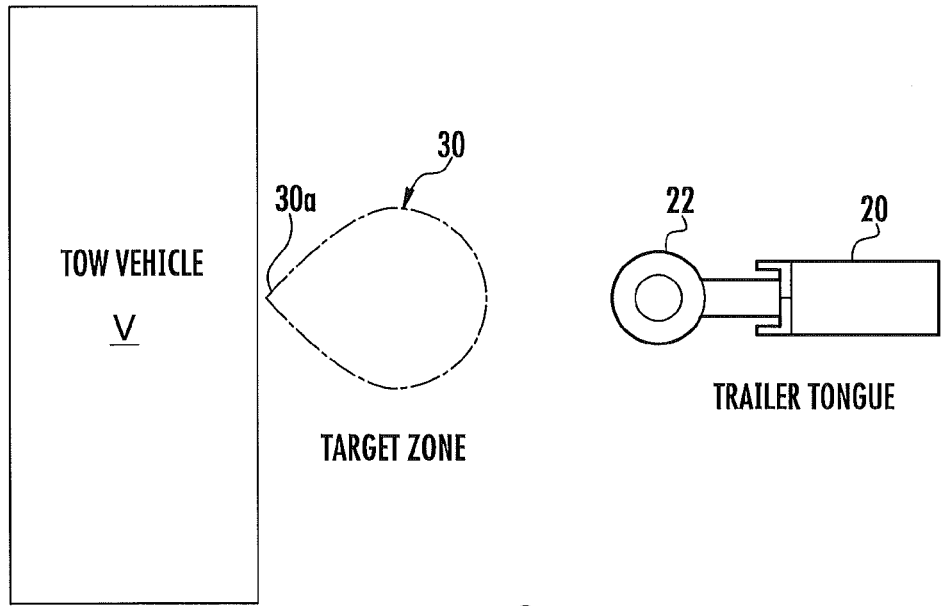
FIG. 3 is a schematic illustration of a towing vehicle and a trailer tongue with a coupling apparatus, and that also shows a target zone within which the trailer tongue coupling apparatus is to be positioned in order to be attached to a movable tow bar of a trailer hitch, such as illustrated in FIGS. 2A-2C, attached to the towing vehicle.

The tow bar 14 of the articulating hitch of FIGS. 1A-1C is movable between retracted and extended positions and is pivotable relative to the housing 12 when in extended positions. As illustrated in FIGS. 2A-2C, the configuration of the tow bar 14 and the housing 12 limit the extent to which the tow bar 14 can pivot and extend relative to the housing 12. FIGS. 2A-2C illustrate the articulation of the tow bar 14 of the trailer hitch 10 of FIGS. 1A-1C. The extent to which the tow bar 14 of the illustrated trailer hitch 10 can pivot relative to the housing 12 progressively increases as the hitch assembly is progressively extended. This degree of articulation of the tow bar 14 defines a target zone 30, illustrated in FIG. 3. The pointed end 30a of the target zone 30 represents the locked position of the articulating hitch (i.e., when the tow bar is in a fully retracted position). The shaded portion of the target zone 30 represents the range of motion where the articulating tow bar of the trailer hitch can be connected to the tongue of a trailer or towed vehicle. In other words, the target zone 30 is the area within which, if the free end of the trailer tongue 20 (i.e., the coupling apparatus 22) is positioned, the trailer tongue can be secured to the articulating tow bar 14 of a trailer hitch.

Figure 4:
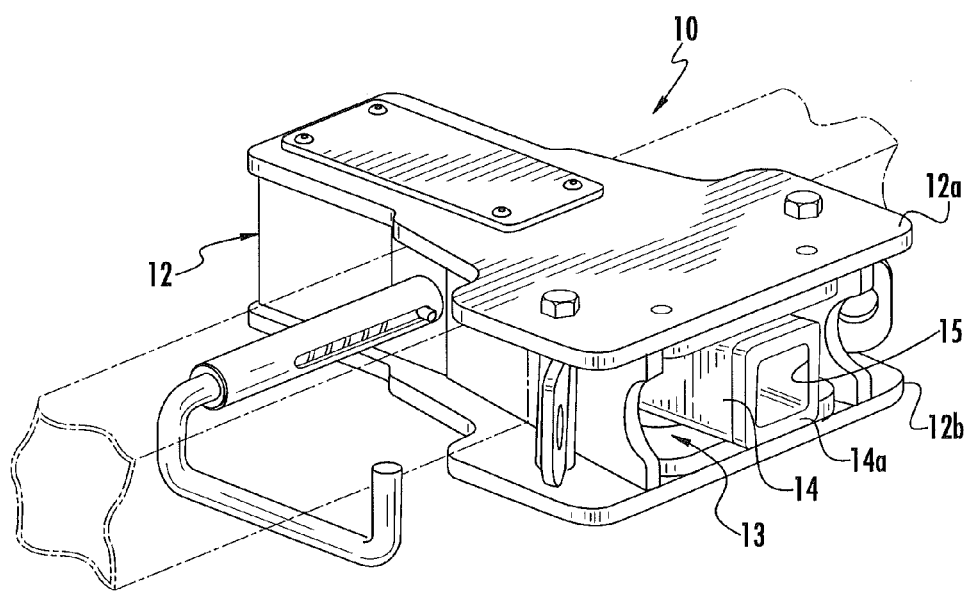
FIG. 4 is a top perspective view of another exemplary articulating trailer hitch apparatus that may be utilized with embodiments of the present invention.

The articulating trailer hitch 10 of FIGS. 1A-1C is provided for illustration only. Embodiments of the present invention are not limited to the illustrated shape/configuration of target zone 30. Various shapes and configurations of target zones are possible depending on the configuration of the type of trailer hitch utilized. Moreover, alignment systems, according to embodiments of the present invention, can be utilized with any type of articulating trailer hitch and with any configuration of target zone that the articulation of a tow bar can define, without limitation. For example, FIG. 4 illustrates another articulating trailer hitch apparatus 10 that can be utilized with alignment systems according to embodiments of the present invention. The trailer hitch apparatus 10 includes a housing 12 and a tow bar 14 movably disposed within the housing 12. The illustrated housing 12 includes spaced-apart first and second sections 12a, 12b that define a longitudinally extending forwardly opening cavity 13 within which the tow bar 14 is movably disposed. The illustrated tow bar 14 is a tubular member having a free end portion 14a. The tow bar free end portion 14a includes an opening 15 that is configured to receive a coupling apparatus, such as a tow ball, pintle clip, lunette ring, etc. In some embodiments, the tow bar free end portion 14a may include a coupling apparatus integrally formed therewith.

The illustrated tow bar 14 in FIG. 4 is movable between retracted and extended positions and is pivotable relative to the housing 12 when in extended positions. The configuration of the tow bar 14 and the housing 12 of the trailer hitch 10 of FIG. 4 limit the extent to which the tow bar 14 can pivot and extend relative to the housing 12. As such, the extent of articulation of the tow bar 14 of the trailer hitch 10 of FIG. 4 defines a target zone similar to the target zone 30 illustrated in FIG. 3.

Figure 9A:
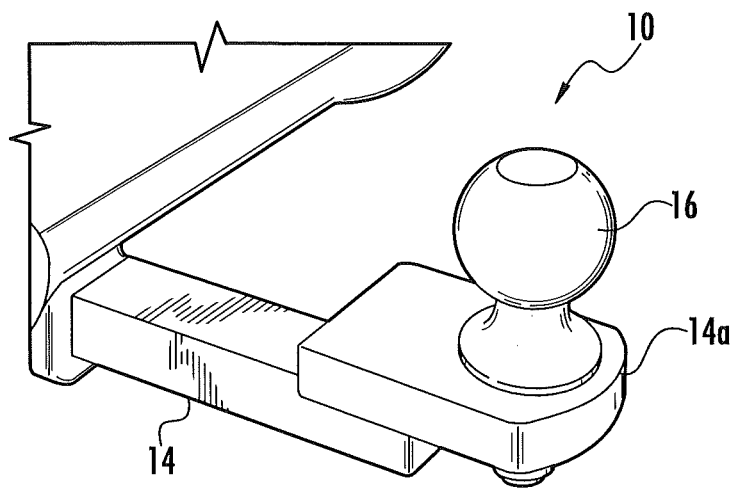
FIG. 9A is a top perspective view of an exemplary trailer hitch with a fixed tow bar that may be utilized with embodiments of the present invention.

Alignment systems, according to embodiments of the present invention, are not limited to use with articulating trailer hitches with movable tow bars. Alignment systems, according to embodiments of the present invention, may be utilized with trailer hitches having fixed tow bars (i.e., tow bars that are not movable), also. An exemplary trailer hitch 10 with a fixed tow bar 14 is illustrated in FIG. 9A. A tow ball 16 is attached to the free end 14a of the fixed tow bar 14 and is configured to be coupled to a tongue of a trailer. However, as would be understood by one skilled in the art of trailer hitches, various other types of coupling apparatus may be secured to the tow bar free end 14a, such as a pintle hook, a cushioned pintle hook, a swivel pintle hook, a lunette ring, a clevis pin attachment, etc., depending on the type of trailer tongue being secured to the tow bar 14.

Figure 9B:
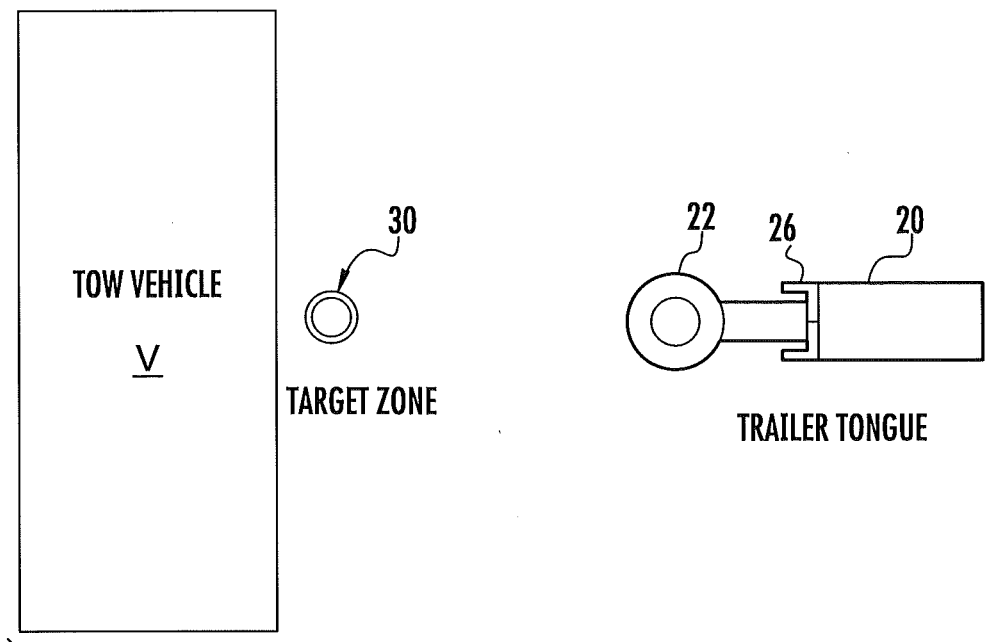
FIG. 9B is a schematic illustration of a towing vehicle and a trailer tongue with a coupling apparatus, and that also shows a target zone within which a trailer tongue coupling apparatus is to be positioned in order to be attached to a fixed tow bar of a trailer hitch attached to the towing vehicle.

FIG. 9B illustrates a target zone 30 for a trailer hitch having a fixed tow bar, such as the trailer hitch 10 illustrated in FIG. 9A. The illustrated target zone represents a location of the fixed tow bar free end and is smaller in size than the target zone for a movable tow bar (e.g., the target zone 30 of FIG. 3).

Referring now to FIGS. 5-8, an alignment system 40 for a trailer hitch (e.g., 10, FIGS. 1A-1C, FIG. 4, FIG. 9A) mounted to a towing vehicle V, according to some embodiments of the present invention, is illustrated. Only a rear portion of the towing vehicle V is illustrated schematically. In addition, only a tongue 20 of a trailer to be towed by the towing vehicle V is illustrated schematically, for clarity. Trailer tongues having various configurations are known and can be used with embodiments of the present invention. In FIGS. 5-8, a lunette ring 22 is mounted to the free end of the illustrated trailer tongue 20. Lunette rings are commonly used in heavy-duty trailers in both commercial and military applications. However, other types of coupling apparatus may be used in lieu of a lunette ring, such as a standard ball coupler or a clevis pin, fifth wheel, etc., as would be understood by those skilled in the art.

As described above, the tow bar of an articulating trailer hitch defines a target zone (30, FIG. 3) according to the extent that the tow bar can be extended and pivoted relative to the trailer hitch housing. Also, a trailer hitch having a fixed tow bar defines a target zone (30, FIG. 9B) that is smaller than that of a movable tow bar of an articulating trailer hitch. The illustrated alignment system 40 includes an energy emitter 42 secured to the towing vehicle V that emits energy in the direction of the trailer tongue 20, and at least two sensors 44a, 44b secured to the vehicle in spaced-apart relationship. Each sensor 44a, 44b is configured to generate signals in response to detecting a reflection of the energy from the trailer tongue 20. In some embodiments of the present invention, two or more energy emitters 42 may be utilized. Embodiments of the present invention are not limited to a single energy emitter 42.

In some embodiments of the present invention, a reflector 24 (or a plurality of reflectors) may be mounted to the trailer tongue 20, although this is not required. The reflector 24 may be temporarily mounted on the trailer tongue 20 or may be permanently mounted thereto. The reflector 24 may have any shape and size and is not limited to any particular shape or size. Energy emitted by the energy emitter 42 is directed towards the reflector 24 which reflects the energy back towards the sensors 44a, 44b. However, the trailer tongue 20 and/or a coupling apparatus 22 attached to the trailer tongue 20 may be sufficiently reflective that a separate reflector is not needed.

Figure 5:
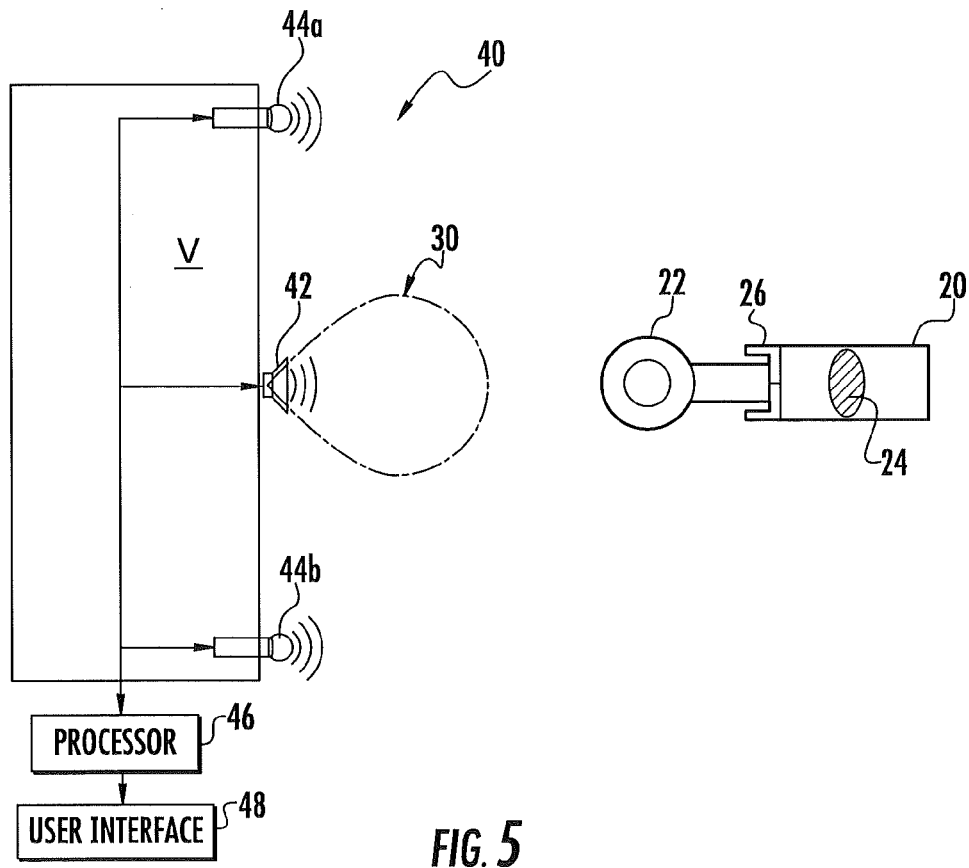
FIG. 5 illustrates an alignment system attached to the towing vehicle of FIG. 3, according to some embodiments of the present invention, that is configured to assist in moving the towing vehicle such that the trailer tongue coupling apparatus can be positioned within the target zone.

In some embodiments, a height adjustment member (e.g., an elongated channel) can be attached to the free end of a trailer tongue to facilitate vertical positioning of a coupling apparatus thereto. Such a height adjustment member may serve as a target that reflects energy emitted by the energy emitter 42. FIG. 5 illustrates a height adjustment member 26 that can serve as a reflective target.

The alignment system 40 also includes a processor 46 in communication with the sensors 44a, 44b that processes the signals generated by the sensors 44a, 44b to provide directional data representative of a location of the trailer tongue 20 relative to a target zone 30. A user interface 48 is in communication with the processor 46 and is configured to display a representation of a location of the trailer tongue 20 and/or coupling apparatus 22 relative to the target zone 30. The user interface 48 and processor 46 may communicate wirelessly and/or via circuitry.

In some embodiments of the present invention, the user interface 48 is located within the towing vehicle V and is readily viewed by a driver of the towing vehicle. For example, the user interface 48 may be part of a heads-up display system that is displayed, for example, on a windshield of the towing vehicle. In some embodiments, the user interface 48 may be displayed via an existing display system associated with the towing vehicle V, such as a navigation system. In other embodiments of the present invention, a handheld device, such as a smart phone, laptop computer, tablet computer, personal digital assistant, game system (e.g., a Sony Playstation Portable device, a Nintendo 3DS device, and the like), etc., may be utilized to display the user interface 48.

The user interface 48 is configured to display the representation of a location of the trailer tongue 20 and/or coupling apparatus 22 relative to the target zone 30 in real time. In addition, the user interface 48 may display directional information for moving the vehicle V and trailer tongue 20 relative to each other such that the trailer tongue 20 and/or coupling apparatus 22 can become located within the target zone 30. In some embodiments of the present invention, the user interface 48 can play audio directional information for moving the vehicle V and trailer tongue 20 relative to each other such that the trailer tongue 20 and/or coupling apparatus 22 can become located within the target zone 30. Audio directional information can include voice recordings, synthesized voice, tones, pulses, beeps, and/or buzzers, among others.

In some embodiments of the present invention, the energy emitter 42, sensors 44a, 44b and processor 46 may be housed within a device attached to the vehicle. Such a device may be attached to the vehicle or may be attached to the trailer hitch, for example, the housing of a trailer hitch. In other embodiments, energy emitter 42, sensors 44a, 44b and processor 46 may be individual components separately mounted to the vehicle. According to some embodiments of the present invention, the sensors 44a, 44b and the at least one energy emitter 42 can be positioned on different parts of a towing vehicle and trailer/towed vehicle. For example, the emitter 42 can be located on the towing vehicle and the sensors 44a, 44b can be located on the trailer, or vice-versa. In addition, the sensors 44a, 44b and emitter 42 can be located on a trailer or towed vehicle.

In some embodiments, the operation of the energy emitter 42 and sensors 44a, 44b is under the control of the processor 46; however, a separate controller may be utilized. In some embodiments of the present invention, the energy emitter 42 and sensors 44a, 44b may communicate with the processor wirelessly and/or via circuitry. In some embodiments of the present invention, the energy emitter 42 and sensors 44a, 44b may communicate with the processor via a combination of wireless communication and circuitry.

Power to the energy emitter 42, sensors 44a, 44b and processor 46 may be obtained from the towing vehicle electrical system. In some embodiments, however, one or more independent power sources (e.g., batteries) may be provided for the energy emitter(s) 42, sensors 44a, 44b, processor 46 and/or user interface 48.

In other embodiments of the present invention, a handheld device, such as a smart phone, may serve the function of the processor 46. The handheld device processes the signals generated by the sensors 44a, 44b to provide directional data representative of a location of the trailer tongue 20 relative to a target zone 30. The display of the handheld device may be utilized as the user interface 48 that displays a representation of a location of the trailer tongue 20 and/or coupling apparatus 22 relative to the target zone 30.

The energy emitter 42 may be virtually any type of device configured to emit energy (i.e., electromagnetic radiation) that can be reflected off of a trailer tongue 20 and be detected by a sensor 44a, 44b. For example, in some embodiments of the present invention, the energy emitter 42 is an optical emitter, such as a light source, and the sensors 44a, 44b are optical sensors configured to detect light reflected off of the trailer tongue. Light may be collimated light (e.g., laser light) or may be non-collimated light. In some embodiments of the present invention, the energy emitter 42 is an infrared emitter and the sensors 44a, 44b are infrared sensors configured to detect infrared light reflected off of the trailer tongue. In some embodiments of the present invention, the energy emitter 42 is an acoustic emitter, such as a speaker, and the sensors 44a, 44b are acoustic sensors, such as microphones, configured to detect sound reflected off of the trailer tongue. In some embodiments of the present invention, the energy emitter 42 is an ultrasound emitter and the sensors 44a, 44b are ultrasound sensors.

The energy emitter 42 and/or the sensors 44a, 44b may be shielded such that energy emitted by the energy emitter 42 does not directly impinge on the sensors. In other embodiments of the present invention, the energy emitter 42 may be configured to emit a focused beam of energy such that shielding is not required. In some embodiments of the present invention, the sensors 44a, 44b may be shielded from external energy sources (e.g., light, sound, etc. from other sources).

Figure 6:
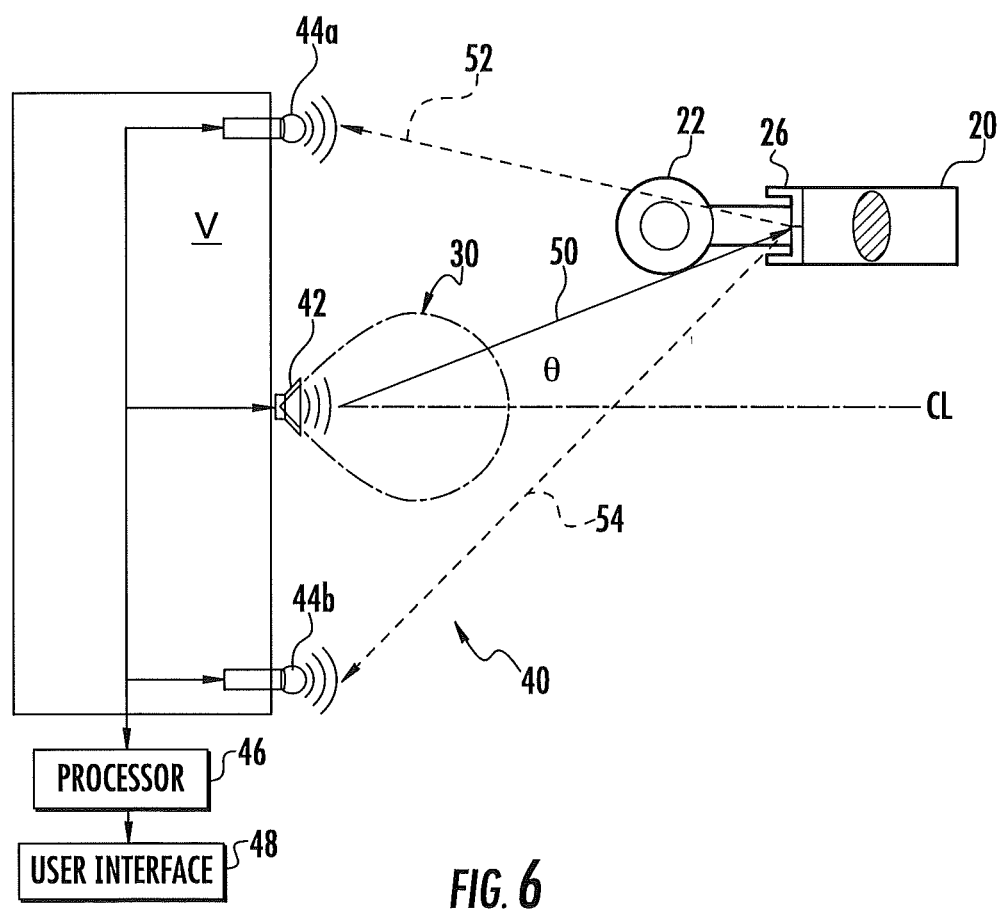
FIG. 6 illustrates the alignment system of FIG. 5 in operation and with the coupling apparatus not yet within the target zone.
Figure 7:
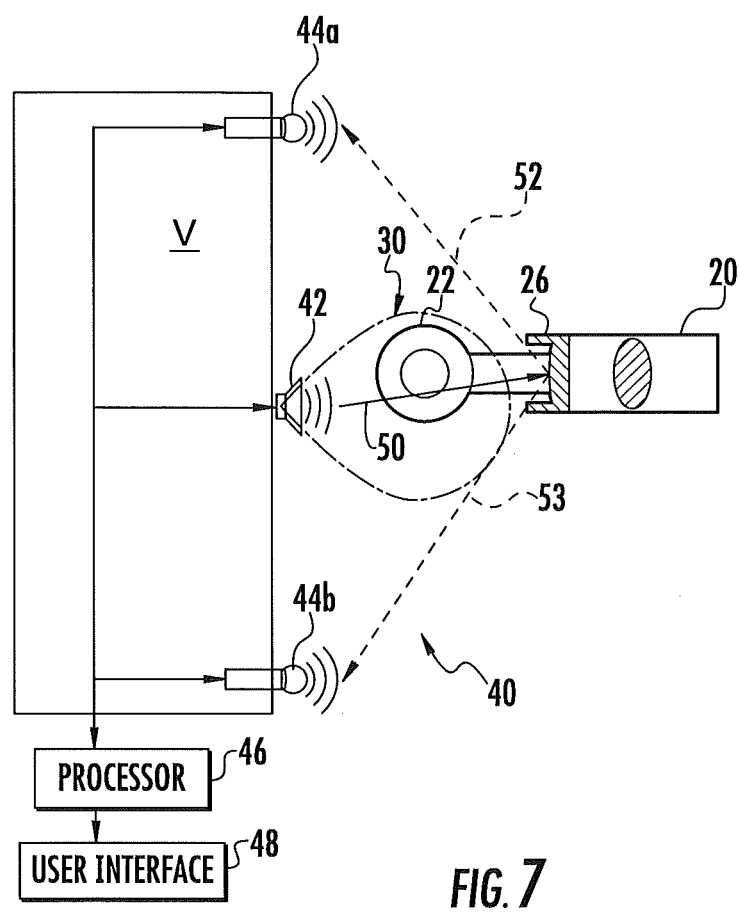
FIG. 7 illustrates the alignment system of FIG. 5 in operation and with the coupling apparatus successfully positioned within the target zone.

Operation of the illustrated alignment system 40 is described with reference to FIGS. 6 and 7. In FIG. 6, energy 50 is emitted from the energy emitter 42 in the direction of the trailer tongue 20 and is reflected off the height adjustment member 26 (or other portion of the trailer tongue 20 or reflector). The energy is reflected towards the first sensor 44a along path 52 and towards the second sensor 44b along path 54. If the trailer tongue 20 and the trailer hitch are in direct alignment (i.e., both centered on centerline $C_L$, the time of flight for path 52 and path 54 will be the same. In other words, the time required for energy emitted from the emitter 42 to reach the trailer tongue reflective portion 26 and reflect back to the first sensor 44a equals the time required for energy emitted from the emitter 42 to reach the trailer tongue 26 and reflect back to the second sensor 44b. Any lateral displacement of the center lines of the trailer hitch and trailer tongue 20 (i.e., both are not centered on centerline $C_L$) will result in different times of flight for path 52 and path 54. This time difference can be used to calculate the relative angular displacement θ of the trailer hitch and the trailer tongue 20. The linear distance (measured radially) can be calculated from the average of the two times of flight (i.e., the time of flight for path 52 and the time of flight for path 54), yielding a point in space that can be compared to the target zone 30.

The user interface 48 will indicate whether the towing vehicle V needs to move left or right to approach the trailer tongue 20 such that the trailer tongue coupling apparatus 22 is positioned within the target zone 30. As the trailer tongue coupling apparatus 22 moves into the target zone 30 (FIG. 7), the actual times of flight on path 52 and path 54 will become short enough that the processor 48 determines that the trailer tongue coupling apparatus 22 is in the target zone 30. The user interface 48 will indicate that the trailer tongue coupling apparatus 22 is in the target zone 30 and that the driver can stop the towing vehicle V and connect the trailer to the trailer hitch.

Figure 8:
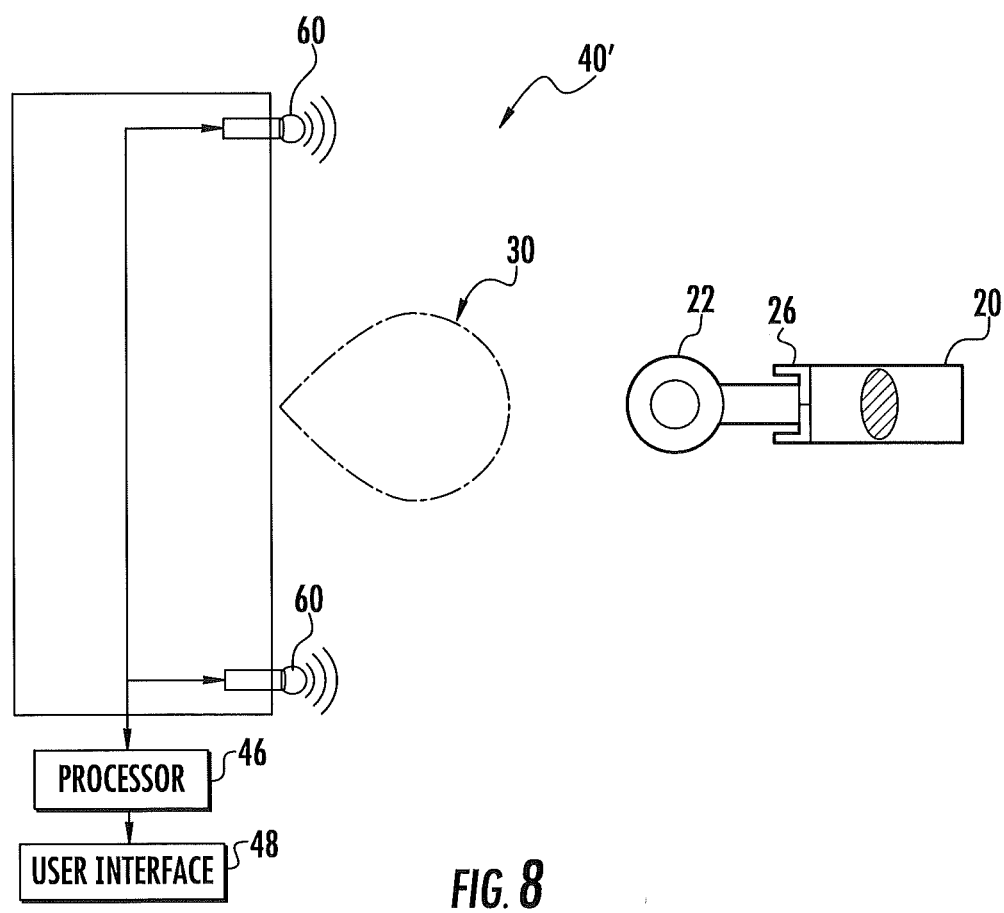
FIG. 8 illustrates an alignment system attached to the towing vehicle of FIG. 3, according to other embodiments of the present invention, and that is configured to assist in moving the towing vehicle such that a trailer tongue coupling apparatus can be positioned within the target zone of an articulating trailer hitch.

An alignment system 40', according to other embodiments of the present invention, is illustrated in FIG. 8. In lieu of a separate energy emitter, a pair of transducers 60 may be utilized. Each transducer 60 is configured to emit energy in the direction of a trailer tongue 20 and generate signals in response to detecting a reflection of the energy from the trailer tongue 20. Various types of transducers may be utilized including, but not limited to, optical transducers, acoustic transducers, and ultrasound transducers. The processor 46 processes the signals generated by the transducers 60 to provide directional data representative of a location of the trailer tongue 20 and/or coupling apparatus 22 relative to a target zone 30. The alignment system 40' operates in a similar manner as alignment system 40 described above.

According to some embodiments of the present invention, the alignment systems 40, 40' described above can be utilized in conjunction with an automated parking/steering system for a towing vehicle. For example, the automated parking/steering system receives directional data from the processor 46 and automatically steers the towing vehicle V relative to the trailer tongue 20 to position the trailer tongue 20 within the target zone. Exemplary automated parking systems include the Advanced Parking Guidance System (APGS) available from Toyota Motor Sales, U.S.A., Inc. (Torrance, Calif.).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. An alignment system for a trailer hitch mounted to a vehicle, wherein the trailer hitch includes a movable tow bar having a free end configured to be coupled to a tongue of a trailer, wherein the tow bar is extendable and pivotable relative to the vehicle, the alignment system comprising:
   an energy emitter secured to the vehicle that emits energy in the direction of the trailer tongue;
   at least two sensors secured to the vehicle in spaced-apart relationship, each sensor configured to generate signals in response to detecting a reflection of the energy from the trailer tongue; and
   a processor in communication with the sensors that processes the signals generated by the sensors to provide directional data representative of a location of the trailer tongue relative to a target zone that represents an area within which the free end of the tow bar can be positioned.

2. A vehicle, comprising:
   a trailer hitch mounted to the vehicle, the trailer hitch comprising a housing having spaced-apart first and second sections that define a cavity and a tow bar movably disposed within the housing cavity, wherein the tow bar comprises a free end configured to be coupled to a tongue of a trailer;
   an alignment system for the trailer hitch, the alignment system comprising:
   an energy emitter secured to the vehicle that emits energy in the direction of the trailer tongue;
   at least two sensors secured to the vehicle in spaced-apart relationship, each sensor configured to generate signals in response to detecting a reflection of the energy from the trailer tongue; and
   a processor in communication with the sensors that processes the signals generated by the sensors to provide directional data representative of a location of the trailer tongue relative to a target zone that represents a location of the tow bar free end.

3. The alignment system of claim 1, further comprising a user interface in communication with the processor that displays a representation of a location of the trailer tongue relative to the target zone.

4. The alignment system of claim 3, wherein the user interface is located within the vehicle.

5. The alignment system of claim 4, wherein the user interface is displayed on a windshield of the vehicle.

6. The alignment system of claim 4, wherein the user interface is displayed via a navigation system display associated with the vehicle.

7. The alignment system of claim 3, wherein the user interface displays a representation of a location of the trailer tongue relative to the target zone in real time.

8. The alignment system of claim 3, wherein the user interface displays directional information for moving the vehicle such that the trailer tongue can become positioned within the target zone.

9. The alignment system of claim 3, wherein the user interface plays audio directional information for moving the vehicle such that the trailer tongue can become positioned within the target zone.

10. The alignment system of claim 1, further comprising a hand held device in communication with the processor, wherein the hand held device comprises a user interface that displays a representation of a location of the trailer tongue relative to the target zone.

11. The alignment system of claim 1, wherein the processor is a hand held device processor.

12. The alignment system of claim 1, further comprising a reflector attached to the trailer tongue that is configured to reflect energy emitted by the emitter.

13. The alignment system of claim 1, wherein the energy emitter is an optical emitter, and wherein the sensors are optical sensors.

14. The alignment system of claim 13, wherein the optical sensors are shielded from direct light from the light source.

15. The alignment system of claim 1, wherein the energy emitter is an infrared emitter, and wherein the sensors are infrared sensors.

16. The alignment system of claim 15, further comprising a shield that shields the infrared sensors from direct infrared light from the infrared emitter.

17. The alignment system of claim 1, wherein the energy emitter is an acoustic emitter, and wherein the sensors are acoustic sensors.

18. The alignment system of claim 17, wherein the acoustic sensors are shielded from direct acoustic energy from the acoustic emitter.

19. The alignment system of claim 1, wherein the energy emitter is an ultrasound emitter, and wherein the sensors are ultrasound sensors.

20. The alignment system of claim 19, wherein the ultrasound sensors are shielded from direct ultrasound energy from the ultrasound emitter.

21. The alignment system of claim 1, wherein the vehicle comprises an automated parking/steering system that receives the directional data from the processor and wherein the automated parking/steering system is configured to automatically move the vehicle relative to the trailer tongue to position the trailer tongue within the target zone.

22. The alignment system of claim 1, wherein the trailer hitch comprises a housing having spaced-apart first and second sections that define a cavity, and wherein the tow bar is movably disposed within the housing cavity.

23. The alignment system of claim 22, wherein the energy emitter and sensors are attached to the housing.

24. An alignment system for a trailer hitch mounted to a vehicle, wherein the trailer hitch includes a movable tow bar having a free end configured to be coupled to a tongue of a trailer, wherein the tow bar is extendable and pivotable relative to the vehicle, the alignment system comprising:
   a pair of transducers secured to the vehicle in adjacent, spaced-apart relationship, wherein each transducer emits energy in the direction of the trailer tongue and generates signals in response to detecting a reflection of the energy from the trailer tongue; and
   a processor in communication with the transducers that processes the signals generated by the transducers to provide directional data representative of a location of the trailer tongue relative to a target zone that represents an area within which the free end of the tow bar can be positioned.

25. An alignment system for a trailer hitch mounted to a vehicle, wherein the trailer hitch includes a tow bar having a free end configured to be coupled to a tongue of a trailer, the alignment system comprising:
   an energy emitter secured to the vehicle that emits energy in the direction of the trailer tongue;
   at least two sensors secured to the vehicle in spaced-apart relationship, each sensor configured to generate signals in response to detecting a reflection of the energy from the trailer tongue;
   a processor in communication with the sensors that processes the signals generated by the sensors to provide directional data representative of a location of the trailer tongue relative to a target zone that represents a location of the tow bar free end; and
   a user interface in communication with the processor that displays a representation of a location of the trailer tongue relative to the target zone.

26. The alignment system of claim 24, wherein the transducers are optical transducers.

27. The alignment system of claim 24, wherein the transducers are acoustic transducers.

28. A method of aligning a trailer hitch mounted to a vehicle with a trailer tongue, wherein the trailer hitch includes a movable tow bar having a free end configured to be coupled to the trailer tongue, wherein the tow bar is extendable and pivotable relative to the vehicle, the method comprising:
   emitting energy in the direction of the trailer tongue;
   generating signals in response to detecting a reflection of the energy from the trailer tongue at first and second sensors secured to the vehicle in spaced-apart relationship; and
   processing the signals generated by the first and second sensors to provide directional data representative of a location of the trailer tongue relative to a target zone that represents an area within which the free end of the tow bar can be positioned.

29. An alignment system for a trailer hitch mounted to a vehicle, wherein the trailer hitch includes a tow bar having a free end configured to be coupled to a tongue of a trailer, the alignment system comprising:
   an energy emitter secured to the vehicle that emits energy in the direction of the trailer tongue;
   at least two sensors secured to the vehicle in spaced-apart relationship, each sensor configured to generate signals in response to detecting a reflection of the energy from the trailer tongue;
   a processor in communication with the sensors that processes the signals generated by the sensors to provide directional data representative of a location of the trailer tongue relative to a target zone that represents a location of the tow bar free end; and
   a hand held device in communication with the processor, wherein the hand held device comprises a user interface that displays a representation of a location of the trailer tongue relative to the target zone.

30. The method of claim 28, further comprising displaying a representation of a location of the trailer tongue relative to the target zone within a user interface.

31. The method of claim 30, wherein the representation of a location of the trailer tongue relative to the target zone is displayed in real time.

32. The method of claim 30, further comprising displaying directional information within the user interface for moving the vehicle such that the trailer tongue can become positioned within the target zone.

33. The method of claim 30, further comprising playing audio directional information for moving the vehicle such that the trailer tongue can become positioned within the target zone.

34. The method of claim 28, wherein the energy emitted is light and the first and second sensors are optical sensors, wherein the energy emitted is infrared light and the first and second sensors are infrared sensors, or wherein the energy emitted is sound and the first and second sensors are acoustic sensors.

35. A vehicle, comprising:
   an automated parking/steering system;
   a trailer hitch mounted to the vehicle, wherein the trailer hitch comprises a tow bar having a free end configured to be coupled to a tongue of a trailer;
   an alignment system for the trailer hitch, the alignment system comprising:
      an energy emitter secured to the vehicle that emits energy in the direction of the trailer tongue;
      at least two sensors secured to the vehicle in spaced-apart relationship, each sensor configured to generate signals in response to detecting a reflection of the energy from the trailer tongue; and
      a processor in communication with the sensors that processes the signals generated by the sensors to provide directional data representative of a location of the trailer tongue relative to a target zone that represents a location of the tow bar free end;
   wherein the automated parking/steering system receives the directional data from the processor and wherein the automated parking/steering system is configured to automatically move the vehicle relative to the trailer tongue to position the trailer tongue within the target zone.

36. An alignment system for a trailer hitch mounted to a vehicle, wherein the trailer hitch includes a tow bar having a free end configured to be coupled to a tongue of a trailer, the alignment system comprising:
   an energy emitter secured to the vehicle that emits energy in the direction of the trailer tongue;

at least two sensors secured to the vehicle in spaced-apart relationship, each sensor configured to generate signals in response to detecting a reflection of the energy from the trailer tongue; and a hand held device processor in communication with the sensors that processes the signals generated by the sensors to provide directional data representative of a location of the trailer tongue relative to a target zone that represents a location of the tow bar free end.

37. A method of aligning a trailer hitch mounted to a vehicle with a trailer tongue, wherein the trailer hitch includes a tow bar having a free end configured to be coupled to the trailer tongue, the method comprising:

emitting energy in the direction of the trailer tongue;

generating signals in response to detecting a reflection of the energy from the trailer tongue at first and second sensors secured to the vehicle in spaced-apart relationship;

processing the signals generated by the first and second sensors to provide directional data representative of a location of the trailer tongue relative to a target zone that represents a location of the tow bar free end; and displaying a representation of a location of the trailer tongue relative to the target zone within a user interface.

* * * * *